May 26, 1931.  A. W. BURKS  1,806,839
STRAINER
Filed March 19, 1928    2 Sheets-Sheet 1

Inventor.
A. W. Burks,
By Cushman, Bryant & Darby
Attorneys

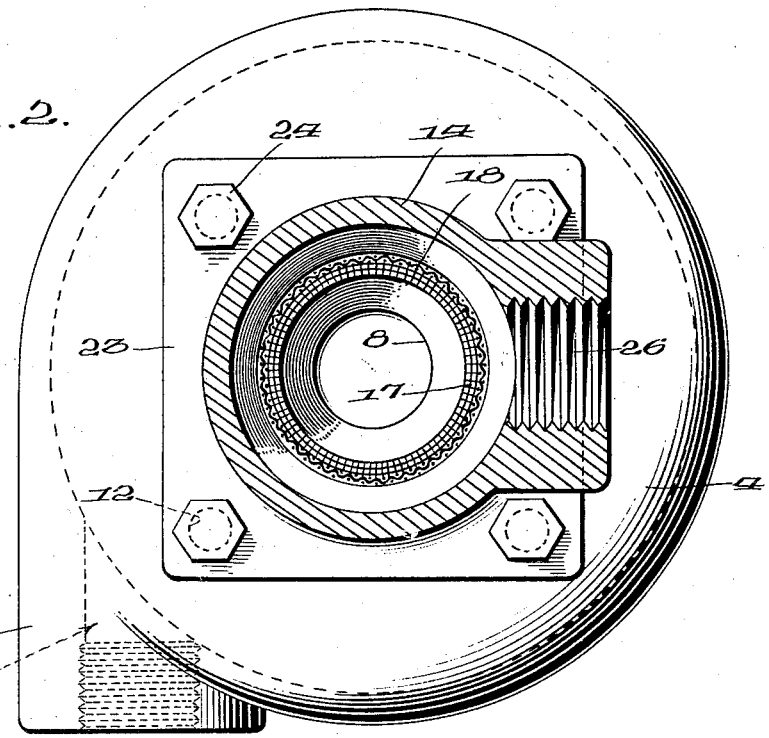
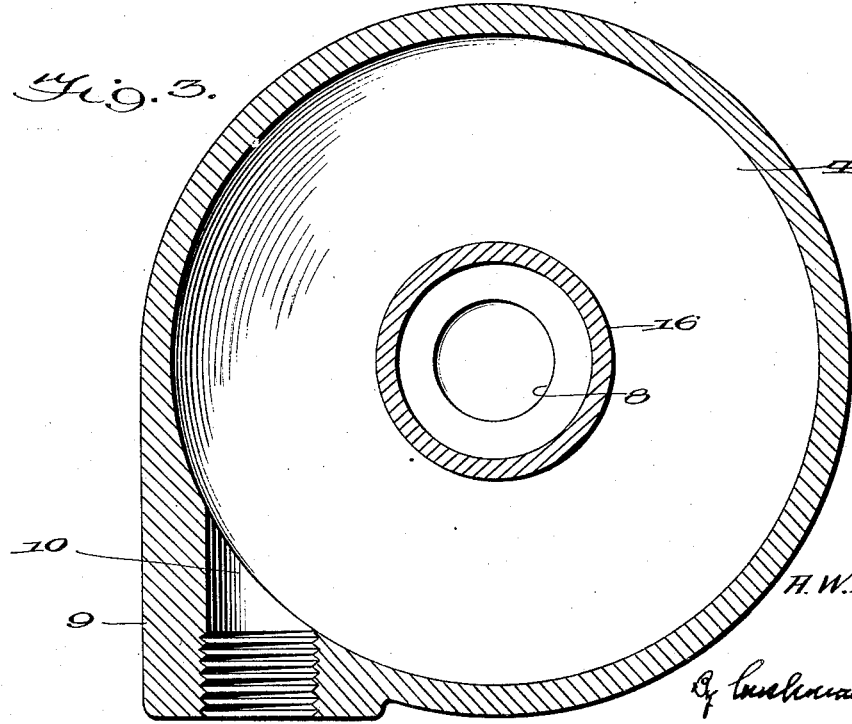

Patented May 26, 1931

1,806,839

UNITED STATES PATENT OFFICE

ARTHUR W. BURKS, OF DECATUR, ILLINOIS

STRAINER

Application filed March 19, 1928. Serial No. 262,932.

This invention relates to new and useful improvements in filtering and strainer devices in general, and more particularly to the type employed in conjunction with pumps for removing impurities and other particles from the fluid prior to its admission to the pump.

An important object of the invention resides in the provision of a device of this type embodying a filtering medium or strainer disposed in such relation that the centrifugal action relied upon for separating particles and impurities from the fluid current, causes said particles and impurities to move away from the filtering medium or strainer, so as to prevent clogging of the same.

Another important object of the invention is to provide a device of this nature in which the various parts are so arranged as to delay the passage of the liquid from the centrifugal chamber to the filtering medium or strainer and impart a downward movement to the flow of liquid prior to its arrival at the filtering medium, so as to impart a primary downward movement to the particles and impurities in the fluid to prevent them from reaching the filtering medium or strainer.

Another important object of the invention resides in the provision of a device of the above character, which includes an outlet head having a lateral outlet port, and which is adjustable to a plurality of predetermined position through 360°, in order that the outlet port of said head may be arranged relative to the inlet of the centrifugal chamber to properly align with and meet a fixed installation of pipes to be connected therewith. Ancillary to this, means are provided for adjusting said outlet head to predetermined positions relative to said centrifugal chamber.

Another object of the invention resides in the provision of a simplified construction which facilitates the cleaning of the filtering medium or strainer as well as an easy removal and replacement thereof and, incidentally, a mounting therefor which facilitates clearing action of the strainer and secure retention of the strainer in proper cooperative position.

Other objects and advantages of the invention will become apparent during the course of the following description.

In the accompanying drawings forming a part of the description, and wherein like numerals are employed to designate like parts throughout the several views:

Figure 2 is a transverse section of the same taken on the line 2—2 of Figure 1, and Figure 3 is a similar section taken on the line 3—3 of Figure 1.

Figure 1:
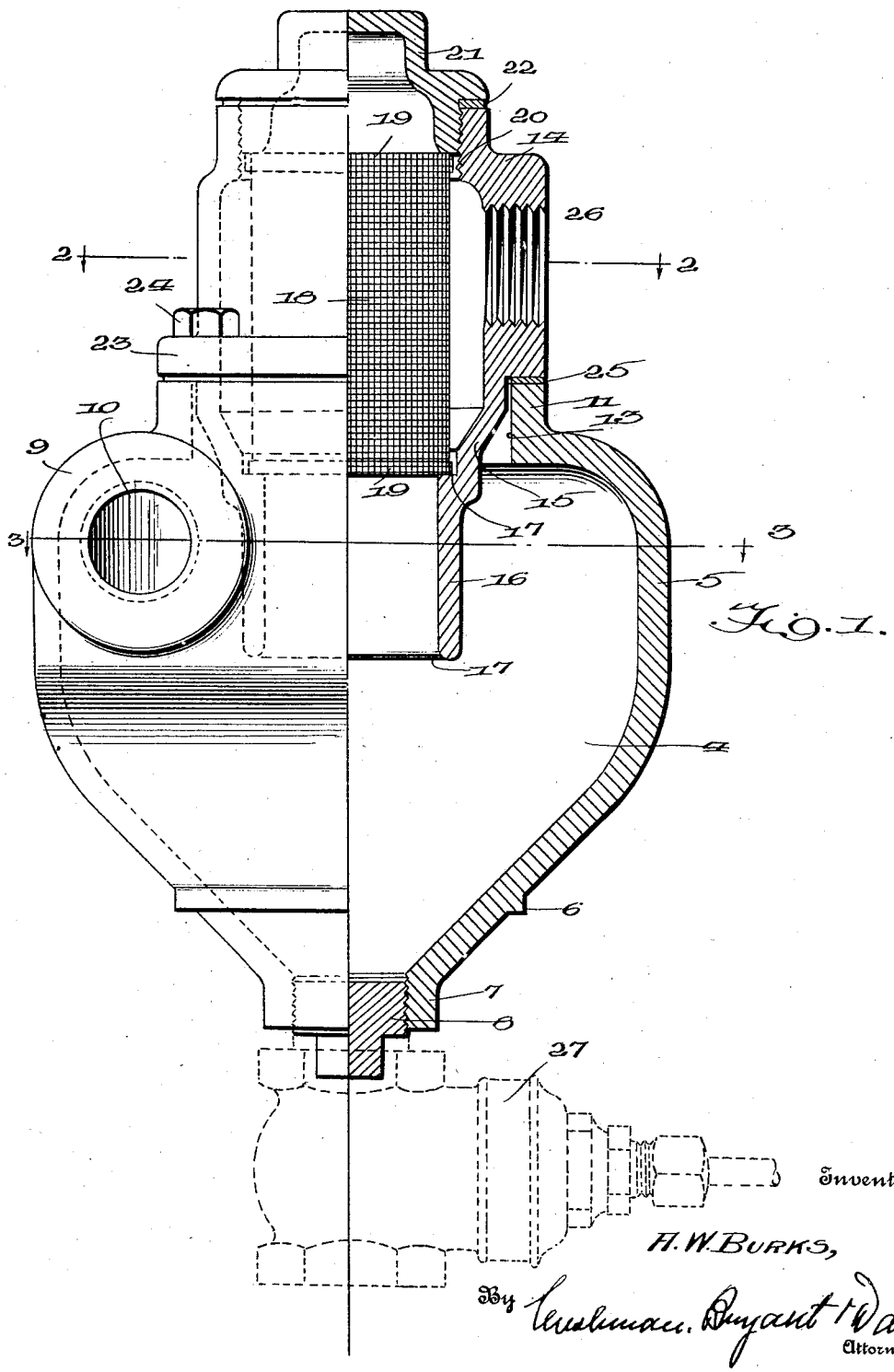
Figure 1 is a side elevation of my improved strainer with one half shown in vertical section.

Referring now more particularly to the drawings, the numeral 4 designates a centrifugal chamber which is substantially of inverted cone-shape and is, of course, circular in transverse section and is provided with a substantially cylindrical portion 5 adjacent its top. The exterior surface of the lower cone-shape portion is provided with an integral annular V-shaped bead 6, and the lower end of this cone-shape chamber terminates in an internally screw threaded nipple 7 into which is screwed a drain plug 8. This bead presents a shoulder with a plane surface arranged at right angles to the longitudinal axis of the chamber in order that these chambers can be stacked one upon the other with the nipple 7 and lower cone shaped portion of one chamber arranged within an opening 13 of another chamber whereby the plane surface of the bead will rest upon the top of a flange 11. The cylindrical portion 5 of the chamber is provided with a laterally projecting boss 9 which is tapped with a bore 10 arranged substantially tangentially to the inner surface of the cylindrical wall 5 for the attachment of an inlet pipe or conduit for conveying liquid under pressure into the chamber 4. Due to the tangential arrangement of the inlet, liquid entering the chamber 4 therethrough is given a whirling or rotary motion within the chamber, thereby establishing a centrifugal force which carries impurities and particles heavier than the water outwardly to the walls of the chamber 4 from where these particles descend by the influence of gravity to the lower end of the chamber which forms a sediment pocket which can be readily cleaned by removing the drain plug 8.

The top of the centrifugal chamber 4 is provided with a square or polygonal extension 11 which is provided at its corners with vertical threaded openings 12. This extension 11 and top of the centrifugal chamber are equipped with a central circular opening 13 for the reception of an outlet head 14. This outlet head is equipped with a reduced downwardly tapered portion 15 adapted to be normally disposed within the opening 13 as shown in Fig. 1. Depending from this tapered portion 15, is a cylindrical flange or baffle 16, which is adapted to depend into the chamber 4 coaxially therewith, with its lower edge 17 terminating below the inlet bore 10, so that liquid from the inlet will not rush into the head 14, but will be delayed and given a primary downward movement to establish a settling or downward movement for the particles held in suspension in the liquid.

The outlet head 14 is equipped with an internal annular shoulder 17 for supporting the lower edges of an open-ended cylindrical strainer screen 18, the body of which is disposed within the hollow head 14 and spaced from the walls thereof a substantial distance to insure proper circulation of the filtered fluid. The ends 19 of the strainer are turned inwardly and suitably stiffened or reinforced in the usual manner to form substantially rigid abutting ends, the lower one of which rests and seats upon the annular shoulder 17 of the head as clearly shown. The upper end of the strainer 18 extends into a threaded opening 20 provided in the top of the head to receive a threaded cap 21, which abuts the upper end of the strainer and securely retains it in place coaxially with the hollow head 14. A suitable packing ring 22 is provided between the flange of the cap and the top of the head 14 to create a fluid tight joint.

The head 14 is provided with an exterior square flange 23 corresponding to the square extension 11 of the centrifugal chamber 4 to register therewith, and at its corners is provided with openings for alignment with the threaded openings 12 in the squared extension 11 for the passage of screws 24 for removably attaching the head to the centrifugal chamber. A packing 25 is interposed between the flange 23 and squared extension 11 to seal the joint therebetween.

The head 14 is provided with an internally screw threaded lateral outlet port 26 in the side thereof for the attachment of an outlet pipe or conduit leading to a pump or any other point. Due to the fact that the head 14 is adjustable and the screw openings in the flanges 11 and 23 are spaced equidistantly apart, this head can be turned and secured in any one of a plurality of different positions 90° apart so as to dispose the outlet port 26 in any one of these four positions to align with and meet a fixed installation of inlet and outlet conduits. Of course, it will be appreciated that if more than four screw openings are provided in the cooperating flanges 11 and 23 and are spaced equidistant from each other, the head 14 can be adjustably secured to the centrifugal chamber 4 in more than four predetermined positions, but the square or polygonal configuration of the extension 11 and flange 23 provides means for definitely determining the position of the outlet port 26 with respect to the inlet port 10 either at right angles or parallel thereto.

It will be obvious that the means provided for attaching the head 14 to the chamber 4 is of general application and may be effectively employed in conjunction with coupling members, one of which is provided with a lateral port adapted to be arranged in different angular positions with respect to the port of the coacting member.

After the clean out plug 8 has been removed from the chamber 4 for the purpose of removing sediment, a blow-off valve 27 may be associated with the nipple 7 for cleaning the strainer 8, or the cap 21 may be removed so as to permit removal of the strainer for more thorough cleaning purposes or replacement.

From the foregoing description of the various parts, it will be seen that liquid entering the centrifugal chamber 4 through the inlet 10 is given a whirling or rotary motion within the chamber, in order that any impurities or particles contained in the fluid will be caused to move, by centrifugal force, outwardly toward the walls of the chamber and away from the strainer 18. Since the cylindrical flange or baffle 16 depends below the fluid inlet, no fluid can pass directly to the strainer 18, but must first be subjected to the centrifugal action for removing impurities, after which it is given a downward movement by the cylindrical flange 16 to impart corresponding movement to particles in suspension, so that they will be directed downwardly into the sediment pocket at the lower end of the chamber 4. Since the particles contained in the fluid are moved by centrifugal force created in the whirling action of the liquid, toward the walls of the chamber 4, these particles slide down the walls into the sediment pocket and the relieved fluid then passes upwardly through the screen 18 and thence to the outlet port 26.

It will be understood that various changes in the size, shape and relation of the various parts may be resorted to without departing from the spirit of the invention or the scope of the appended claims.

Having thus fully described the invention, what I claim is:

1. A strainer comprising a liquid settling chamber having a liquid inlet port, said chamber having an opening in its top surrounded by a supporting surface, a detachable outlet head arranged above said chamber and having a shoulder adapted to rest upon said supporting surface, said outlet head having a lateral outlet port, said head having an imperforate tubular portion depending through the opening in said chamber and extending downwardly and concentrically into said chamber with its lower end arranged in a plane below said inlet port, said depending tubular portion having an internal shoulder, a cylindrical strainer arranged concentric within said head and having its lower end resting upon said shoulder, a portion of said strainer being arranged opposite said lateral port, and a cap secured to said outlet head and engaging the top of said strainer.

2. A strainer comprising a liquid settling chamber having a liquid inlet port, a detachable outlet head mounted on said chamber and having an imperforate tubular portion depending therefrom into said chamber with its lower end arranged in a plane below said inlet port, a strainer element disposed within said head in the path of flow of liquid to said outlet, one end of said strainer being supported upon said tubular portion, and a cap secured to said outlet head and engaging the other end of the strainer to retain it in position.

In testimony whereof I have hereunto set my hand.

ARTHUR W. BURKS.